E. C. LEHSOU.
WAGON LOADING DEVICE.
APPLICATION FILED APR. 23, 1920.
1,385,560.
Patented July 26, 1921.
3 SHEETS—SHEET 1.
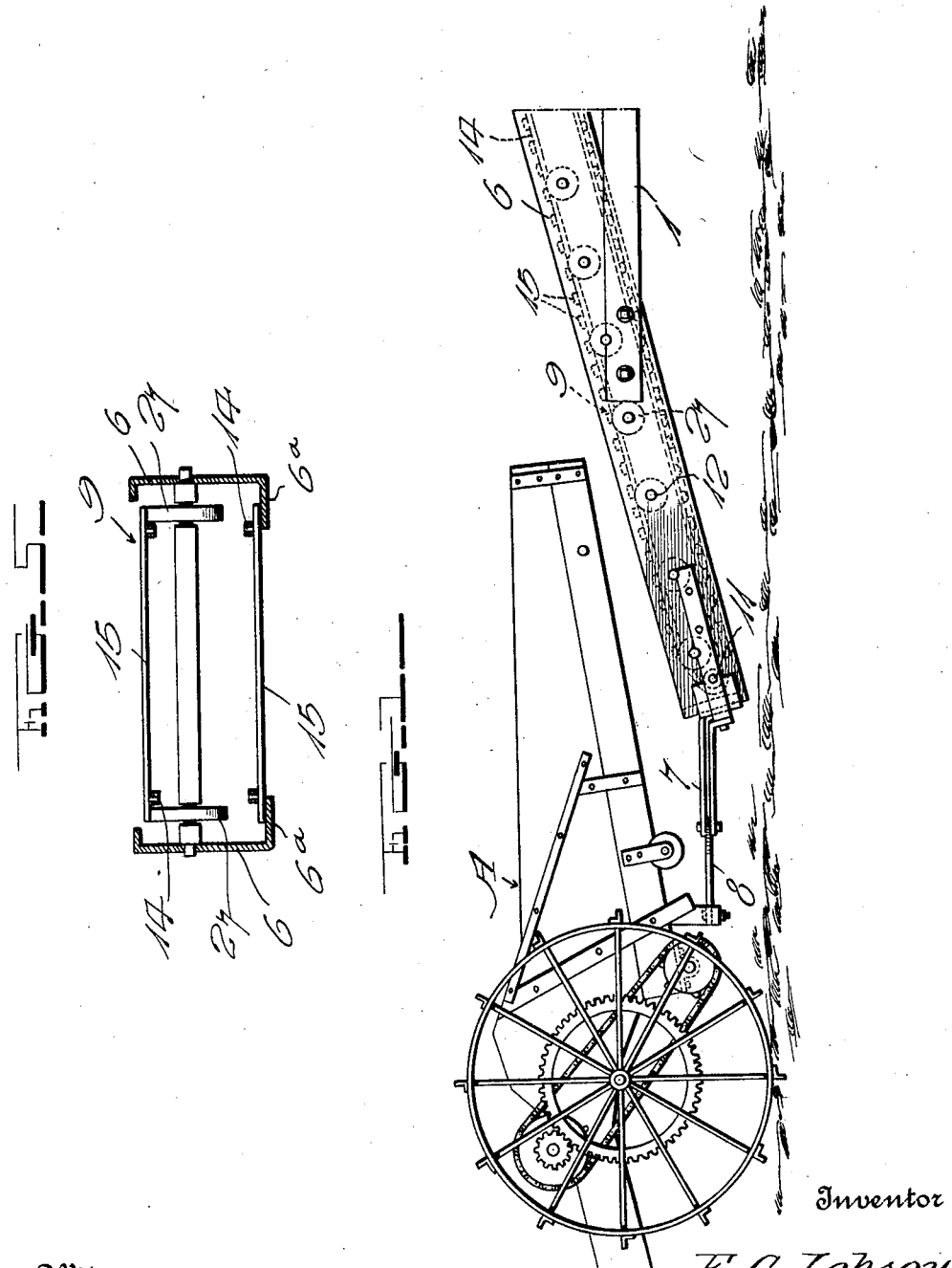

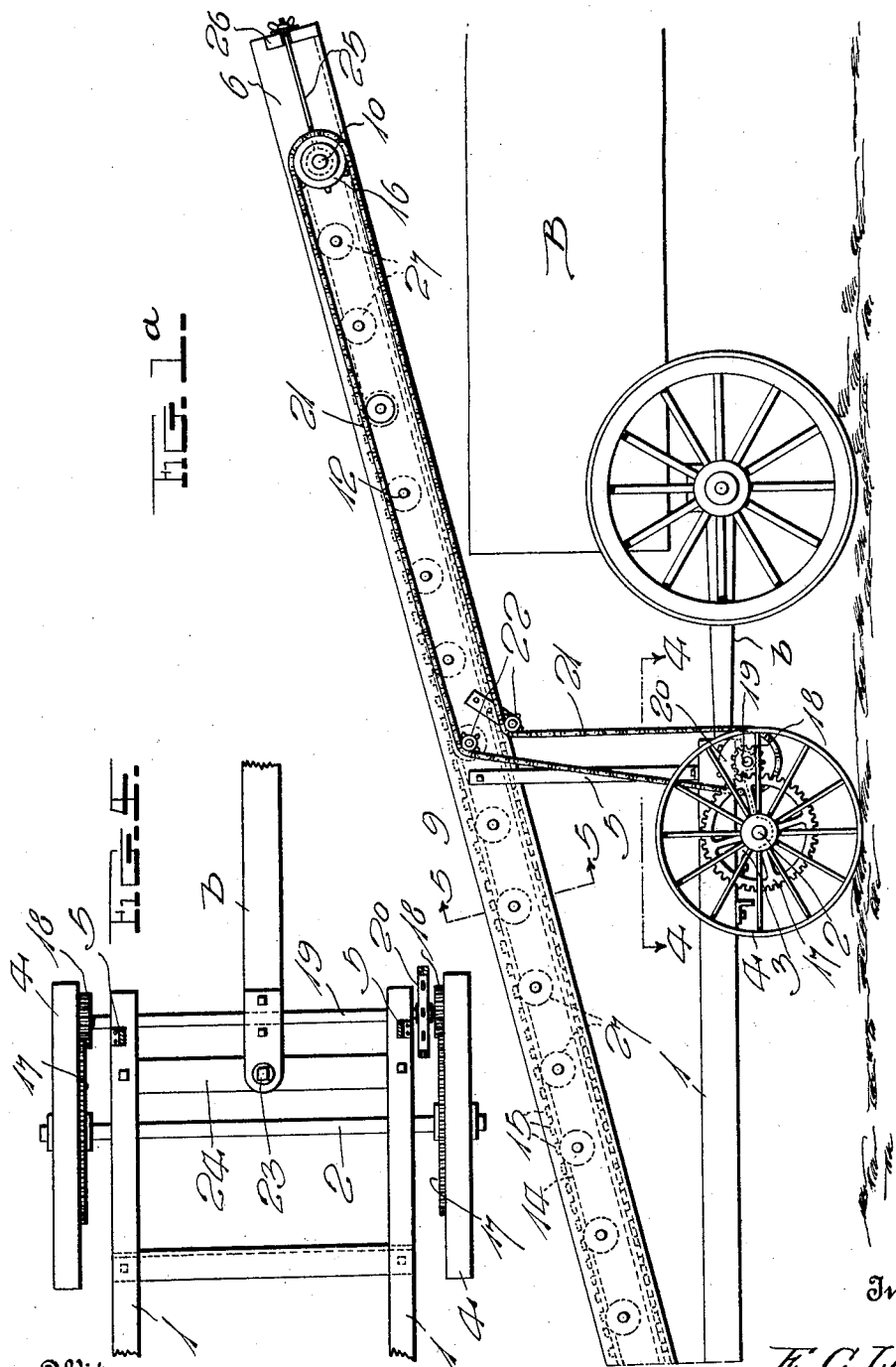

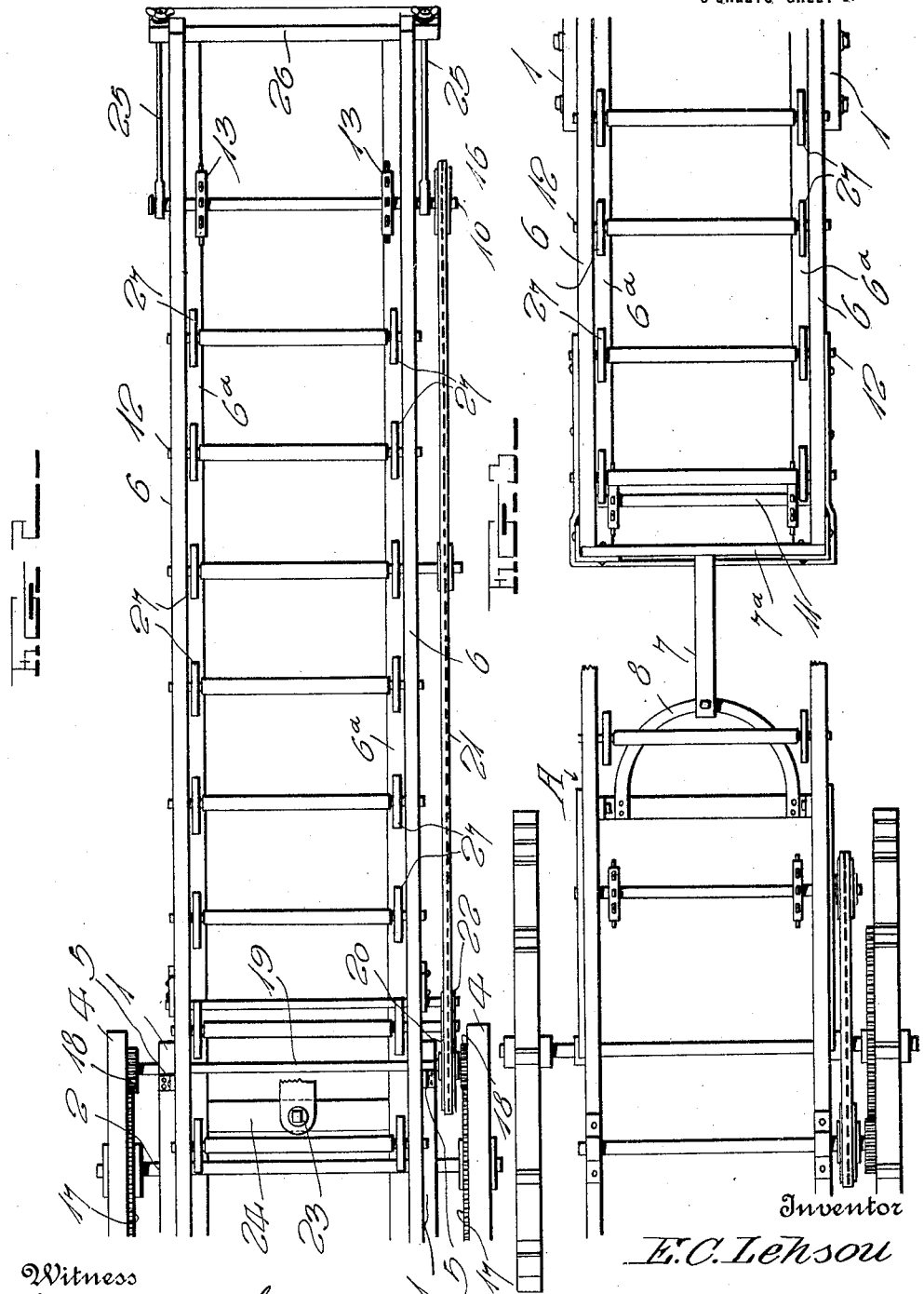

UNITED STATES PATENT OFFICE.

EMIL C. LEHSOU, OF MISSOULA, MONTANA.

WAGON-LOADING DEVICE.

1,385,560.  Specification of Letters Patent.  Patented July 26, 1921.

Application filed April 23, 1920. Serial No. 376,133.

*To all whom it may concern:*

Be it known that I, EMIL C. LEHSOU, a citizen of the United States, residing at Missoula, in the county of Missoula and State of Montana, have invented certain new and useful Improvements in Wagon-Loading Devices; and I do declare the following to be a full, clear, and exact description of the invention, such as will enable others skilled in the art to which it appertains to make and use the same.

This invention relates to wagon-loading devices, and more specifically to an improved trailing traction conveyer for receiving potatoes or the like from a digging or harvesting machine and delivering the harvested material into a wagon or the like being trailed thereafter.

Other objects and advantages will be pointed out or implied in the following details of description in connection with the accompanying drawings, in which:

Figures 1 and 1ª taken together constitute a side elevation of my improved wagon-loading device or traction conveyer in connection with a potato digger, in front, and a wagon behind, portions of the potato digger and wagon being omitted.

Fig. 2 is a top plan view of a portion of the structure shown in Fig. 1ª.

Fig. 3 is a top plan view of a portion of the structure shown in Fig. 1.

Fig. 4 is a horizontal sectional view substantially along the line 4—4 of Fig. 1ª.

Fig. 5 is a sectional view substantially along the line 5—5 of Fig. 1ª.

Referring to these drawings in detail, in which similar reference characters correspond with similar parts throughout the several views, and in which the potato digger A and the wagon B may be of any ordinary and appropriate construction, the invention consists of the construction and arrangement of parts which will now be described as follows:

Referring more particularly to Figs. 1ª and 2, this traction conveyer or loading device comprises two substantially horizontal beams 1, a rotary shaft or axle 2, bearings 3 in which the axle 2 is journaled, and a pair of traction wheels or ground-wheels 4 on the axle or rotary shaft 2. This portion of the structure constitutes a truck, and a pair of uprights 5 are secured on and extend up from this truck. Moreover, the invention comprises a pair of substantially parallel frame bars 6 which have their front end portions secured at 7 to the front end portions of the beams 1, their rear end portions extending a considerable distance rearward of the rear ends of the beams 1, and their intermediate portions are secured to and supported by the upper ends of the uprights 5. By this construction and arrangement, it will be seen that the frame bars 6 are upwardly and rearwardly inclined to such an extent that the wagon B can extend a sufficient distance under the conveyer, which includes the bars 6, to permit this conveyer to discharge its load by gravity into the wagon B; also, that the front end of this conveyer is sufficiently low to extend under the discharge end of the potato digger A so as to receive the load discharged from the potato digger. A tongue or draft member 7 is rigidly united with a cross bar 7ª which connects the front ends of the frame bars 6, and a member 8 of the potato digger A is pivotally connected to the member 7.

A chain-conveyer, belt-conveyer or other form of endless conveyer 9 is carried by and disposed between the frame bars 6, that is, it is carried by a series of shafts or rotary elements 10, 11 and 12, which are journaled in the frame members 6. In this embodiment of the invention, the shaft 10 has sprockets 13 thereon. Chains 14 are carried by these sprockets and slats 15 are carried by the chains 14. The shaft 10 also carries a sprocket 16.

One of the traction wheels 4 carries a driving gear wheel 17 which meshes with the gear-wheel 18, carried by shaft 19, and this shaft is journaled in suitable bearings 1ª which are secured to the rear end portions of the beams 1. A sprocket 20 is also carried by the shaft 19, and a driving chain 21 operatively connects the sprockets 16 and 20, so that the endless conveyer 9 is driven by the wheel 4 which is geared thereto. However, in the present instance, as shown, there are two of each of the members 17 and 18, so that each wheel 4 is geared to the shaft 19. Any ordinary and appropriate clutch or ratchet mechanism may be employed between one or both of the wheels 14 and their adjacent wheels 17, but such clutch is not shown, being no part of this invention. Two idlers or sprockets 22 are provided for each of chains 21, these idlers being journaled on the frame-bars 6 at points substantially vertically alined with the sprockets 20. These idlers guide the chain 21 in such relation that its front end portion is substantially vertical, while its rear end portion is rearwardly and upwardly inclined, thereby avoiding interference of the chain 21 with the wagon B when the latter is in the position shown in Fig. 1ª, that is, in position to be trailed or drawn by the wagon-loading device, and in position to discharge this load into the wagon. The wagon tongue b may be attached to the wagon-loading device by the means illustrated in Fig. 4 or by any appropriate means. In Fig. 4, the wagon tongue is pivoted at 23 to a cross-bar 24 which constitutes one of several frame elements of the truck. In order to properly tension the chain 21 a pair of adjusting members 25 are provided, each of these members having one end formed into a ring, which surrounds the shaft 10, and its other end being screw threaded and provided with a nut which operates against a cross-bar 26 of the frame which carries the endless conveyer.

Each of the shafts 12 carries a pair of rollers 27 which carry the ends of the slats of the endless conveyer. This construction prevents the conveyer from sagging, and at the same time imparts lateral vibratory movement to the conveyer so as to shake the dirt loose from the potatoes and cause it to pass down between the slats of the conveyer. Each of the frame-bars 6 may be provided with an inwardly extending flange 6ª on which the rearwardly moving part of the conveyer slides so as to prevent this lower portion of the conveyer from sagging, thereby permitting the upper portion of the conveyer to sag slightly between the pairs of rollers 27, thus increasing this vibratory movement for loosening the dirt from the potatoes.

From the foregoing description, it will be seen that I have provided a unitary traction conveyer which can be attached to and trailed behind many kinds of potato diggers and harvesting machines, in position to receive the harvested material, and which provides ample room under the discharge portion of the conveyer for a wagon to extend and be connected to and trailed behind this traction conveyer.

It is not intended to limit this invention to the exact details of construction and arrangement as described and shown, but changes may be made within the scope of the inventive ideas as implied and claimed.

What I claim as my invention is:

In a traction-operated conveyer, a pair of substantially horizontal beams, a pair of traction wheels supporting said beams and located at the rear ends of these beams, a pair of uprights on and extending up from the rear ends of said beams, a conveyer-frame including a pair of rearwardly and upwardly inclined frame-bars having their front end portions secured to those of said horizontal beams, their rear ends extending rearward beyond said wheels and horizontal beams, and their intermediate parts being secured to and supported by said uprights, a shaft journaled on the rear ends of said horizontal beams, transmission gearing operatively connecting said shaft to said traction wheels, a sprocket carried by said shaft, an endless conveyer-belt between and carried by said frame bars, a shaft journaled in the rear end portion of these frame-bars, a sprocket on this latter shaft, a driving chain on the sprockets, and idlers on said frame bars at points substantially in vertical alinement with the first said sprocket, these idlers serving as guides to hold the chain out of the way of a wagon while the wagon extends under the rear end of the conveyer and while the conveyer discharges its load from said rear end into the wagon.

In testimony whereof I have hereunto set my hand.

EMIL C. LEHSOU.